Dec. 20, 1938.        McG. CLINE        2,140,513
PROCESS OF TREATING OLEO-RESINS AND PRODUCTS RESULTING THEREFROM
Filed Aug. 3, 1935
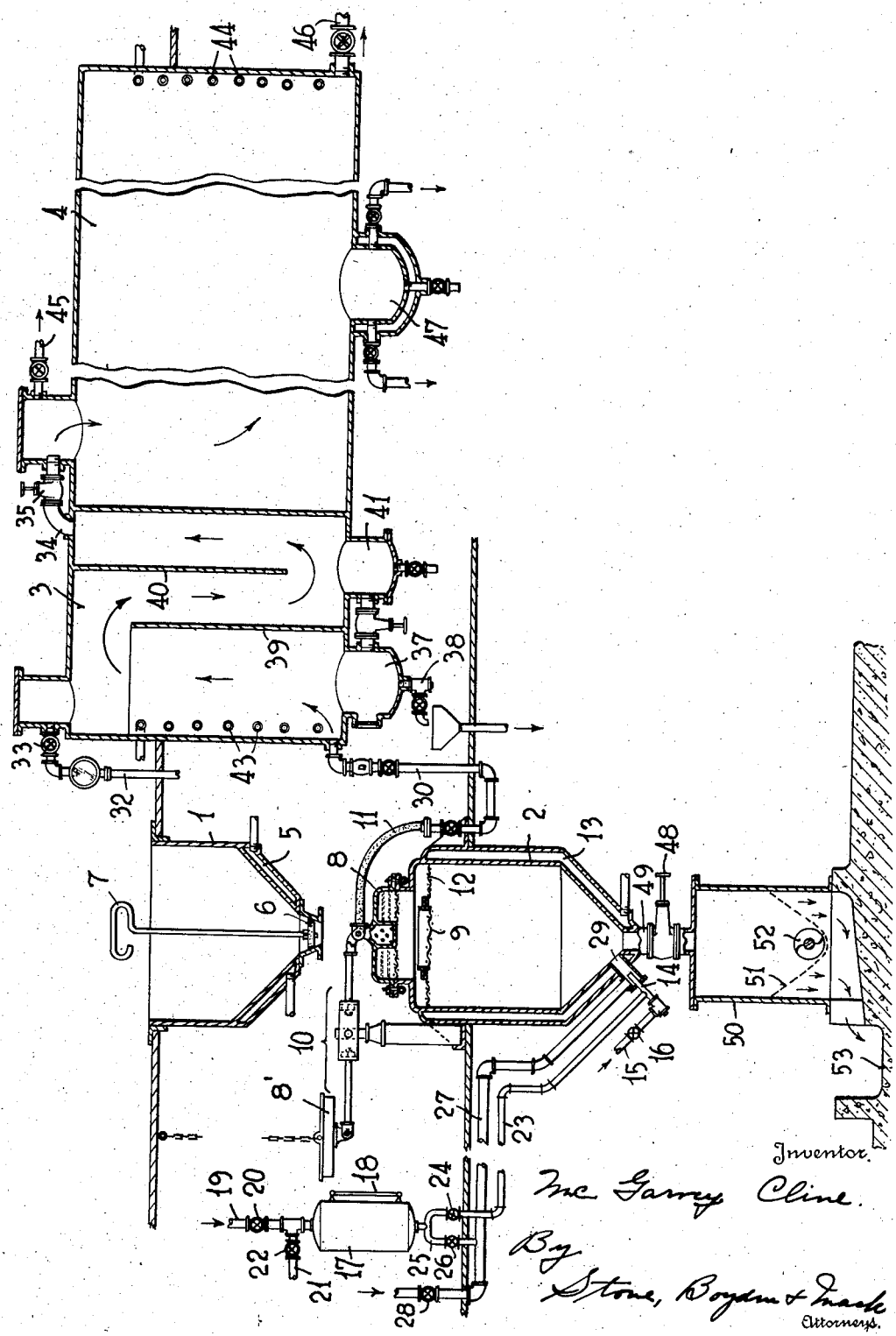
Inventor.
McGarvey Cline.
By
Stone, Boyden & Mack
Attorneys.

Patented Dec. 20, 1938

2,140,513

UNITED STATES PATENT OFFICE 2,140,513

PROCESS OF TREATING OLEO-RESINS AND PRODUCTS RESULTING THEREFROM

McGarvey Cline, Jacksonville, Fla.

Application August 3, 1935, Serial No. 34,623

14 Claims. (Cl. 260—107)

This invention relates to improvements in methods of processing crude oleo-resins, and more particularly to the treatment of crude oleo-resins to render them suitable for handling as bulk commodities in ordinary steel storage tanks or steel tank cars without corrosion thereof or without discoloration of the oleo-resinous material.

In the process of the present invention, oleo-resins as obtained from trees and prior to converting them into rosin and turpentine, are modified by reducing their acidity and crystallizing tendencies, and removing from them certain solid impurities to thereby render them suitable for shipment and for use in various industries. Commercial utilization of rosins obtained from oleo-resins generally involves their complete conversion or partial conversion into various resinates. Advantage is taken of this by using alkaline reagents as means for modifying oleo-resins to make them available to the consuming industries in liquid form in large quantities.

As is well known, crude pine oleo-resins constitute the basic raw material of the gum naval stores industry. They are obtained by the periodic scarification of pine trees and directing the oleo-resin, which exudes from the scar, into cups attached to the trees. The exudations are removed from the cups and collected in barrels, which are the containers ordinarily used for the transportation of the crude oleo-resin from the forest to the still. During the long period of exposure of the oleo-resin in flowing from the tree to the cups, and in the cups prior to its collection, the oleo-resin is subject to contamination of various kinds. Oxidation is the most important agency in modifying the materials from a chemical standpoint. Practically all of the constituents of oleo-resin are unsaturated compounds and combine with oxygen at ordinary atmospheric temperatures. Such combinations produce various acids, also gummy materials which are only slightly soluble in the original oleo-resinous materials even after they have been liquefied by the application of heat. These gummy substances coalesce around particles of dust with which the tacky material becomes contaminated during its period of exposure to the elements. The oleo-resin also becomes contaminated with chips, pine needles, bark, sand, and water containing traces of tannic acid, other organic acids, and various other organic water soluble materials. The amount of such contamination varies with the weather and other conditions of exposure.

The average barrel contains approximately 435 pounds of oleo-resin and contaminating materials. The general practice of the gum naval stores industry is to charge from eight to ten barrels of the crude as it is delivered from the forest into direct fire stills for separating the volatile constituents (turpentine, water, and volatile acids) from the non-volatile constituents (rosin, contaminating chips, etc., and other non-volatile matter) of the crude material as delivered from the forest. After the volatile constituents have been removed, the melted rosin, heated to a temperature of approximately 320 degrees Fahrenheit, together with all of the extraneous trash and other non-volatile materials, is discharged from the still through strainers and cotton batting for making a substantial separation of the solid non-volatile materials from the liquid non-volatile materials (rosin, tannic acid and other non-volatile water soluble materials) contained in the original crude oleo-resin.

It has long been recognized by the industry that this method of treating the crude oleo-resins involves the following highly undesirable results:

1. A substantial loss of rosin due to its absorption and adhesion to the cotton batting and extraneous solid matter contained in the crude oleo-resin. (Chips, bark, pine needles, sand, etc.)

2. A lowering of the color grade of the rosin. (½ to 1½ grades.)

3. The contamination of the rosins with finely divided trash which is not removed by the method of filtering through cotton batting.

4. The contamination of the rosins with varying amounts of non-volatile organic materials contained in the crude oleo-resin including the products of oxidation resulting from exposure. These products are largely responsible for the variable color of gum rosins.

5. Production of rosins showing maximum variability in color and in their chemical composition. (13 color grades and variable contamination with tannic acid and water soluble carbohydrates and other non-volatile water soluble materials contained in the crude oleo-resin.) Small batch treatment of the crude oleo-resins without bulk mixing before distillation is, of course, partially responsible for the variability in the rosins produced.

In present general practice there is obtained, for example, from a typical barrel of crude oleo-resin the following assortment of materials:

|   |   | Pounds |
|---|---|---|
| a. | Rosin | 297 |
| b. | Turpentine, 10.7 gallons | 77 |
| c. | Chips, bark, needles, etc | 21.5 |
| d. | Sand and fine trash | 2.8 |
| e. | Batting dross | 5.7 |
| f. | Water and unaccounted for | 31.0 |
|   | Average total per bbl. crude gum | 435.0 |

Items c, d and e are saturated and covered with rosin, aggregating approximately 18 lbs. Item a represents the rosin recovered which contains all of the non-volatile materials in solution with the original water content of the crude oleo-resin together with all non-volatile materials extracted from the chips, pine needles, etc., by the solvent action of the oleo-resinous material during the long boiling operation (tannic acid, various carbohydrates, and miscellaneous unknown extracts and mineral matter). Item f is the original water content of the crude oleo-resin containing in solution various volatile organic acids, principally acetic and formic acids. These volatile acids are highly corrosive to iron and other metals and their presence in the crude oleo-resin makes it impractical to store or ship them in low cost metal containers without serious discoloration of the oleo-resinous material.

Pine gum, or oleo-resin obtained from southern yellow pine, for instance, Pinus palustris or Pinus caribaea, or other trees, is a complex mixture of volatile terpenes, resin acids, other resinous compounds, organic volatile acids, water soluble carbohydrates, and other unidentified materials. The non-volatile portions of the oleo-resin consist largely (approximately 90 percent) of isomeric and isomorphous resin acids. The remainder of the non-volatile portions consists largely of an unidentified mixture of materials generally designated as resines. The general physical properties of this complex mixture of materials is dominated by the bulk of crystalline resin acids of low solubility in the viscous liquid portions of the aggregate, which liquid portions are characterized by a corrosive acidity. The crystalline resin acids are composed of two major groups of acids identified as pimeric and sapinic acids, in the respective proportions of approximately 30% and 70%. These crystalline acids are complex unsaturated compounds and the sapinic acids are very unstable to the action of heat.

The manufacturing methods of the gum naval stores industry and the organization of the industry for the distribution of its products are entirely predicated upon the fact that its raw material, crude pine oleo-resin, is not economically adapted for handling as a bulk commodity. In this respect it constitutes a rare exception among the industries using an agricultural product as a raw material for the production of commodities required by varied chemical industries. I have discussed the general effects of this situation as a retarding influence upon the technical development of the manufacturing methods of the gum naval stores industry in the specification of my Patent No. 1,945,421. Practical development work along the lines revealed in this patent has stressed the economic importance of bulk oleo-resinous products to those chemical industries which are large consumers of the resin acids and terpenes. The resin acids are exceedingly sensitive to modification by heat treatments and the requirements of the consuming industries are best served by making available to them the acid and terpene constituents of oleo-resin with minimum modification from the forms in which they are produced by the tree. The direct fire stills now generally used for the conversion of oleo-resin into commercial rosin and turpentine are poorly adapted to the production of products characterized by uniformity of chemical and physical composition.

The resin acids present in the crude oleo-resin are largely present in crystalline forms because of their low solubility in the terpene constituents of the oleo-resin. The major constituents of these crystalline acids have been identified as pimeric and sapinic acids. The crystallization of these acids has mitigated, to a certain extent, against the bulk storage and shipment of crude oleo-resins. The serious contamination of the crude oleo-resins with water and extraneous chips and other trash has also seriously interfered with its treatment as a bulk commodity.

The crystalline as well as other resin acids occurring in pine oleo-resins have complex molecular structures which are highly unstable with reference to both the action of heat and exposure to oxygen. Heat induces isomerization and polymerization which materially affects the solubility of the acids in the associated terpenes. Heat also accelerates oxidation. All such modifications of these acids, however, tend to increase the color bodies in the acids, which generally affect their commercial utilization. This general state of affairs with respect to oleo-resins makes obvious the desirability of making the resin acids available to consumers in a form where they have been subjected to a minimum of influences modifying their original structure. The necessary modifications to accomplish the ends desired are preferably those which have the least effect upon the ultimate utilization of the oleo-resinous materials.

Necessary modifications referred to for converting crude oleo-resins into a bulk commodity are set forth in the description of the present invention which has for its general objects:—

1. To effectively and economically remove from the crude material those constituent materials which are neither resin acids nor terpenes, to as great an extent as may be feasible within the limits imposed by the cost of the operation.

2. To obtain an oleo-resinous product which is substantially immune to discoloration from contact with iron and other metals.

3. To obtain an oleo-resinous product of maximum fluidity which does not require the introduction of solvents in addition to the natural terpene constituents of the oleo-resin. Such a product involves an inhibition of the formation of crystalline resin acids to an extent which does not interfere with the bulk transportation, storage, and use of the commodity.

The first of the above general objectives is fully discussed in my copending application, Serial No. 20,836 filed May 10, 1935 (Case A). The last two general objectives are the major purposes of the methods and products which will now be described.

The highly ionized water soluble acid constituents of crude oleo-resin are responsible for the corrosive properties of the material with respect to iron and other metals. The metallic salts of these acids have characteristic colors and are generally soluble in the oleo-resinous material. Such salts are responsible for the typical discolorations resulting from contact of oleo-resins with various metals. Iron produces discolorations ranging from dark reds to black; copper produces green discolorations; the salts of aluminum and zinc, being colorless, contaminate, although they do not discolor.

The aggregate amount of volatile water soluble acid constituents of the crude oleo-resin may be readily determined by weighing and titrating the aqueous distillate obtained by subjecting a sample of the crude to the process of steam distillation for separating it into its volatile and non-volatile components.

Having determined the average acidity of the crude oleo-resins being processed due to its volatile acid content, any suitable alkaline material may be added, the selection being largely influenced by solubility and the practice of the rosin consuming industries relating to their processing of rosin. The hydroxides of the alkaline earth metals (generally calcium hydroxide, or in some cases barium hydroxide on account of its greater solubility and reactivity with the resin acids) may be used in cases where it is not known that the processed oleo-resin is to be used for the production of water soluble resinates composing paper size and soap stock. When the oleo-resin processed is to be used for the production of soap or paper size, any of the hydroxides or carbonates or bicarbonates of the alkali metals (generally sodium hydroxide or sodium carbonate) may be used. Ammonium hydroxide may also be used.

As distinguished from the process set forth in my copending application Serial No. 24,981 filed June 4, 1935 in which reagents are added to neutralize water soluble acids contained therein, an excess of alkaline material over that required for the neutralization of water soluble acids is added to insure the complete neutralization of these highly ionized acids and also for the conversion of small amounts of the resin acids into metallic resinates, which resinates in solution with the oleo-resinous material, inhibit the recrystallization of the resin acids from the resulting oleo-resinous product. Very small amounts of metallic resinates in solution with the oleo-resinous material retard crystallization sufficiently to serve the ordinary requirements of storage and transportation. Larger amounts may be present in compounding products for long time storage.

The effective execution of the compounding operations which have just been generally described will now be described in detail in connection with the apparatus shown in the accompanying drawing in which the figure is a vertical sectional view partly in elevation of the apparatus.

For a more complete description of the apparatus and the details thereof, reference is made to my copending application, Serial No. 20,836.

The apparatus in the accompanying drawing comprises a hopper 1, a melter 2, a separator 3 and a storage tank 4. Oleo-resinous material to be treated, particularly crude oleo-resin, is introduced into the melter 2 from the hopper 1. At the time of introduction, the charge is substantially at atmospheric temperature. A heating jacket 5 is provided on the hopper 1 so that the walls thereof may be heated merely to facilitate charging when the valve 6 is opened by pulling upwardly on the handle 7. If desired, the oleo-resin may be heated to melt the same before introducing it into the melter 2.

The melter 2 is beneath the hopper 1 so that material from the latter may fall directly into the melter. The melter 2 is provided with a removable filter head 8 of any desired construction, an extra filter head 8', and a removable screen 9. To charge the melter 2, the filter head 8 is removed conveniently by means of a mechanism designated generally by the numeral 10. The details of a highly efficient filter head and mechanism for removing the same is described in my application Serial No. 20,836. A flexible pipe 11 connected to the filter head 8 is readily disconnected when the latter is about to be lifted and swung off. The removable screen 9 extends across a central opening in and is supported and held in position by a fixed screen 12 that is horizontally positioned in the upper portion of the melter a short distance below the charging hole thereof.

The charging hopper 1 and the melter 2 are so proportioned that one hopperful of the material to be charged will fill the melter to a level somewhat lower than the level of the fixed screen 12. After the charge has been introduced into the melter, the screen 9, filter head 8, and flexible pipe 11 are assembled as shown in the drawing. When thus assembled, the melter is pressure tight.

Heat is then applied to the crude oleo-resin either directly or indirectly or both to thereby render it fluid and readily miscible. Direct heating is preferred and indirect heating is dispensed with if desired. The melter 2 may be provided with a steam jacket 13 for indirect heating, and a jet 14 for injecting a heated fluid such as steam, superheated or saturated if desired, into the charge. Saturated steam is generally preferred. In heating a charge, some indirect heat may be applied while a major supply of heat is derived from pressure steam injected into the melter. The steam thus injected effectively agitates and mixes with the charge, and rapidly melts the oleo-resin while condensing in the melter and delivering its latent heat. The live steam serves also as a means for uniformly dispersing the various materials, employed in treating the oleo-resins, throughout the bulk of material being processed as will be described below. The injection of steam is continued until a temperature is reached above the melting point of constituents of oleo-resins. Steam may be introduced until a slight pressure at the head of the melter indicates that the charge has been heated to a temperature at which the steam no longer condenses, which temperature may be approximately 200° to 212° F. The crude oleo-resins may be thoroughly liquefied by heating them to approximately 180° F. or higher. The steam for direct heating is supplied to the jet 14 through a pipe 15 provided with a valve 16.

A tank 17 is provided with a gauge 18 for measuring liquid reagents, and is connected to the tank 2 by suitable piping for conducting the liquids thereto at various stages in the process. A pipe 19 provided with a valve 20 and connected to the top of the tank 17 may serve for introducing treating liquids. A pipe 21 provided with a valve 22 and connected to the pipe 19 may serve to introduce air or pressure steam for placing the contents of the tank 17 under pressure. A pipe 23, provided with a valve 24, connects the tank 17 to the jet 14. A pipe 25, provided with a valve 26, connects the tank 17 to a pipe 27 provided with a valve 28. The pipe 27 is connected to a tube 29 which opens into the tank 2 and is arranged concentrically around the jet 14.

Routine analyses conducted at a plant afford the basis of calculating the amount of alkaline material required for a given charge of material in the tank 2. The alkaline material, generally in solution in water, is measured in the tank 17, placed under pressure, and may be gradually forced into the melter 2 through the pipe 23. The alkaline solution preferably heated by the steam forced through the jet 14 is injected into the charge preferably in a highly atomized condition and thoroughly mixed with the in-rushing steam. The force of the injected steam vigorously agitates the charge while the oleo-resin is being rapidly liquefied.

The rate of injecting the alkaline solution is regulated so that the total time for injecting the required amount of alkaline material coincides approximately with the total time required for the complete liquefaction of the charge by the injection of steam. While other methods of injecting the alkaline materials could be used, and while the alkaline materials may be injected after the charge is liquefied as well as before, this method is described as being a peculiarly simple and effective method of accomplishing the desired contact of materials so as to obtain first, the complete neutralization of the highly ionized corrosive acids, and second, the uniform dispersion of the metallic resinates produced from the alkali not consumed in the neutralization of the more active water soluble acids.

In the particular operation under discussion, let is be assumed that a fresh water solution of an hydroxide of one of the alkaline earth metals has been injected into the oleo-resin being processed. Hydroxides of these metals react readily with the water soluble acids but are much less reactive with the resin acids at the temperatures used in the operation. They do, however, react slowly with the liquefied resin acids to a limited extent, sufficient to inhibit the recrystallization of the resin acids.

During treatment with alkaline reagents, the temperature of the oleo-resin is preferably maintained between the temperature at which the resins become liquid and the boiling point of water or slightly above under a corresponding increased pressure.

After the batch of oleo-resin has been thoroughly liquefied and emulsified with the alkaline solution, the liquid contents of the melter 2 are forced through the screens 9 and 12, and through the filter head 8 and connecting pipes 11 and 30 into the separator 3. The emulsion of oleo-resinous material and slightly alkaline aqueous solution constitute an unstable mixture in which the oleo-resinous material has the higher specific gravity. The bulk of the aqueous solution collects at the top of the separator and is withdrawn through the outlet pipe 32 provided with a valve 33. The oleo-resinous material flows from the separator 3 into the storage tank 4 through the outlet pipe 34 provided with a valve 35. Sufficient time is allowed for substantial separation of the aqueous and oleo-resinous solutions.

After the treated oleo-resinous material cools into a viscous liquid substantially stable emulsions may be formed therewith in aqueous solutions. The fluidity of the oleo-resinous products at ordinary atmospheric temperatures, is increased by a slight emulsification with aqueous matter; and when such aqueous matter is slightly alkaline, its presence insures the alkalinity of my products. The aqueous matter withdrawn from the separator carries in solution with it substantially all of the water soluble materials contained in the original oleo-resin, the water soluble acids being removed as acetates and formates etc., all of which are highly soluble in water. Resinates of the alkaline earth metals are insoluble in water; they, therefore, remain as constituent parts of the oleo-resinous material.

When it is desired to treat the crude oleo-resins with aqueous solutions of alkaline compounds of the alkali metals which form resinates that are soluble in fresh water but which are substantially insoluble with salt water, the alkaline material is applied in solution with a concentrated brine. The general procedure is the same as described above, except with respect to the separation of the oleo-resinous material from the aqueous solution. The brine injected increases the specific gravity of the aqueous solution so that it is heavier than the oleo-resinous liquids. In such cases the aqueous solution is withdrawn from the separator through its bottom outlets. More complete dehydration of the oleo-resinous compounds can be obtained by using brine instead of fresh water as a solvent for the alkaline material. The use of brine, however, involves the possibility of having traces of salt contained in the oleo-resinous products. Traces of salt are not objectionable where the oleo-resinous material is used for the production of soap or paper size. In other instances, however, there might be objection to such traces of salt.

The injection of brine into the tank 2 may, if desired, take place after the alkaline reagent has been introduced. Generally, however, brine, steam and alkaline solution may be introduced simultaneously. The brine is introduced by means of the pipe 27 into the tubular connection 29 around the jet 14. Solution of alkaline reagents in the brine may be brought about before injection by opening the valve 26 to permit the flow of alkaline material from the tank 17 into the pipe 27.

As stated above, if brine (or other suitable liquid of proper specific gravity) is used to displace the melted oleo-resin into the separator 3, any brine entering the latter settles to the bottom and is withdrawn through a cleaning pump 37 provided with a valved outlet 38. The separator 3 is provided with baffles 39 and 40, the former extending part of the way up from the bottom around the sump 37 and the latter extending part of the way down from the top above a sump 41. Except when emptied for cleaning or other purposes, the separator is always filled with oleo-resins being processed. Materials having a specific gravity higher than the liquid oleo-resins are removed, principally through the sump 37, and secondarily at intervals, through the cleaning sump 41. The flow of liquids through the separator 3 is indicated by arrows.

The separator 3 and the tank 4 are provided with heating means 43 and 44 respectively for regulating the temperature of the contents, to maintain the latter in a thin liquid condition so that gravity separation may be accelerated. The storage tank 4 is provided with a regulated vent 45 which permits the operation of both the separator and tank under pressures for example slightly greater than atmospheric pressures. The vent line is provided with suitable check valves to admit air as material is drawn from the tank 4 and the separator 3, but to direct the vapors and air vented through a condenser (not shown) for the recovery of the vapors. The air from the condenser should in this case be led through a water seal.

The tank 4 is preferably elevated for gravity discharge into tank cars through valved outlet 46, or through a steam jacketted sump 47.

When the filtering operation in the melter 2 has been completed, a discharge valve 48 in the outlet 49 at the bottom and a testing valve in the filter head (valve not shown in the drawing) are opened, the hot displacing liquid flows rapidly from the melter 2 carrying with it the chips and other trash, previously washed to remove adhering oleo-resin material. The displacing liquid is discharged into the chip strainer 50 which is provided with a perforated metal bottom 51, and a conveyor 52. The displacing liquid drained from the chips is returned through a flume 53 to a storage tank (not shown). The drained chips are removed from the strainer by means of the conveyor 52. After dumping the contents of the melter 2, the latter is recharged and the operating cycle repeated.

The entire process, described above, is preferably carried out in vapor tight apparatus in which the various steps from the heating of the oleo-resinous material in the melter 2 to the cooling of the final product are conducted without appreciable loss of volatile terpenes.

As set forth in my co-pending application, Serial No. 20,836 method of accomplishing the separation of the oleo-resinous material from the contaminating gummy and colloidal substances, water soluble materials, and extraneous solid matter, is to synchronize an inverted displacement filtration operation such as that described above, with a gravity sedimentation. The gummy substances coalesced around particles of dust are highly adhesive and of higher specific gravity than the liquefied oleo-resins and when the liquid is not subject to agitation, these materials settle slowly to the bottom. Agitation is prevented when filtering and a removal of clarified oleo-resinous materials secured at the top of the charge by forcing it upward through the floating extraneous solid matter and a filtering medium at the top of the container. This is accomplished by the controlled injection of a fluid displacement medium into the bottom of the container. The general requirements regarding the displacing fluid are, that it be of higher specific gravity than the liquid oleo-resin and non-miscible with it. In some cases oleo-resinous materials may be used as displacing media.

The rate of injecting the displacement fluid is preferably one which does not force the settling gummy materials through the floating extraneous solid materials so rapidly that they are deposited upon the filtering medium. Such controlled displacement is described as synchronizing displacement with sedimentation and adhesion of gummy materials. With such control, filtration can be accomplished in a minimum of time and with greater efficiency with respect to the use of the filtering medium. The most efficient rates of displacement for different classes of oleo-resin will be determined in the course of some little operating experience depending on the particular materials and equipment used. It is obvious, however, that sedimentation can be completed before the injection of the displacement medium is started.

Water is the most available displacement medium. Its use is also advantageous because it serves as a selective solvent for highly ionized organic acids contained in the oleo-resin, and also as a solvent for various non-volatile materials which contaminate the crude oleo-resin and for certain salts formed in the process. Hot liquid oleo-resin and water at the same temperature are of approximately the same specific gravity. The desired difference in the specific gravity of the two liquids may be obtained, either by lowering the specific gravity of the oleo-resin by thinning it with turpentine or other low gravity solvent for it, or by increasing the specific gravity of the water by means of salt or other high gravity material soluble in water. Lowering the specific gravity of the oleo-resin by the addition of turpentine has advantages which lead to the selection of this method in certain specific cases.

Brine is the most generally preferred displacing medium in the present process. It is used with a high degree of efficiency and is remarkably effective and outstanding in the displacement of oleo-resins from solid impurities found in the crude material. It is highly effective in the treatment of crude oleo-resins from any source including, for instance, trees of the order Pinales and more particularly the species of pines known as *Pinus palustris* and *Pinus caribaea*, which are the most common varieties of Southern yellow pine.

It is well known that the basic operation in the use of the resin acids for the production of soaps and sizes is the conversion of such acids into their water soluble metallic resinates, while a generally used step in the use of resin acids in the manufacture of paint and varnish is to partially convert these acids into water insoluble resinates. Generally speaking, the resinates produced by the reaction of resin acids with the alkali metals, including ammonium resinate, are soluble in fresh water but are substantially insoluble in salt water, the resinates produced by the reaction of the resin acids with the alkaline earth metals are substantially insoluble in both fresh and salt water. Substantially all of these resinates of the resin acids are soluble in the warm liquefied oleo-resin. Ammonium resinate differs from the other resinates in being highly unstable to the action of heat at moderately low temperatures, even decomposing slowly at ordinary atmospheric temperatures.

The treatment of oleo-resins by the present process, in which the above facts regarding solubility are taken advantage of, makes it possible to produce in an efficient manner large quantities of oleo-resins in a form that renders them more desirable than rosin.

The cost of producing the modified oleo-resins is less than the cost of converting the crude oleo-resins into rosin and turpentine. The process of preparing the modified oleo-resins in the present invention involves the removal of various impurities from the crude oleo-resin, which impurities are left in the rosins by present methods of producing rosins. Being a bulk commodity, the products of the present invention can be mixed in large amounts so as to obtain an average product highly uniform with respect to physical and chemical properties. Being a bulk liquid commodity, the products of the present invention can be shipped in tank cars and stored in tanks, thus eliminating cost of packages and transportation and handling costs associated with commodities in package form. Furthermore, the resin acids, being available in liquid form, are much more susceptible to operations involving chemical conversions than are rosins in the form of small lumps. The labor and rosin losses incident to removing it from packages and reducing it to a finely divided form are also eliminated. Large scale experiments have shown that it requires approximately one seventh of the time to convert a given amount of resin acids, in the liquid form, into paper size or soap stock, as it does to convert the same amount of rosin.

The resin acids in my products are substantially in the forms produced by the tree, having not been affected by the high temperature treatments to which they are ordinarily subjected for their conversion into rosin. The modified oleo-resins are also ideally adapted for assembling at centralized plants for the production of rosin and turpentine or other desirable products. At such plants means can be provided for the application of the most approved methods of refining and processing pine oleo-resins. Such methods can not be applied to the oleo-resins under the conditions of small scale, isolated use of direct fire stills which impose rigid restrictions upon the methods and products of the gum naval stores industry.

What I claim is:

1. A process comprising injecting into a mass of crude pine oleo-resin exudates an alkaline reagent and a liquid medium in which said exudates are relatively insoluble, converting water soluble acids and a portion only of resin acids contained in said exudates into salts of said acids, the said salts of said resin acids being substantially insoluble in said liquid medium but soluble in said oleo-resin exudates, filtering the resulting mass and separating from the resulting mass an oleo-resinous aggregate containing uncombined resin acids, and resinates.

2. A process comprising injecting into a mass of crude pine oleo-resin exudates containing solid impurities, steam, an alkaline reagent, and a liquid medium in which oleo-resin exudates are relatively insoluble, converting the said exudates into a liquefied mass in which water soluble acids and a portion only of the resin acids contained in said exudates are changed to salts of said acids but in which uncombined resin acids and terpenes contained in said exudates are substantially unchanged, introducing liquid medium in contact with the resulting mass to displace the treated crude oleo-resin exudates while filtering the said mass, and separating from the resulting mass an oleo-resin aggregate containing uncombined resin acids and resinates, the said resinates being present in amount insufficient to render the aggregate completely soluble in water, and the said aggregate remaining in a flowable state under ordinary conditions of shipping.

3. A process comprising emulsifying pine oleo-resin exudate with an aqueous medium and distributing an alkaline reagent throughout the said exudate in amount sufficient to neutralize substantially all the water-soluble acids contained in the said exudate and to convert a portion only of the resin acids in the said exudate into resinate material, thereby producing an emulsion of an exudate containing uncombined resin acids and resinates, the proportion of the resinates formed being insufficient to render the exudate completely soluble in water.

4. A process comprising emulsifying pine oleo-resin exudate with brine and distributing an alkaline reagent throughout the said exudate in amount sufficient to neutralize substantially all the water-soluble acids contained in the said exudate and to convert a portion only of the resin acids in the said exudate into resinate material, thereby producing an emulsion of an exudate containing uncombined resin acids and resinates, the proportion of the resinates formed being insufficient to render exudate completely soluble in water.

5. A process comprising treating undistilled pine oleo-resin exudates with an alkaline reagent insufficient in amount to combine with all of the acid material in the said exudates but sufficient to neutralize water-soluble acids present in the said exudates and a portion only of the resin acid content, thus avoiding the conversion of the exudates into an oleo-resin aggregate that is appreciably soluble in water, and maintaining the exudates in fluid, readily miscible form throughout this treatment, to produce thereby a non-corrosive, substantially water-insoluble oleo-resin exudate that is flowable under ordinary shipping conditions.

6. A process comprising treating undistilled pine oleo-resin exudates with an alkaline reagent containing an alkali metal compound, sufficient in amount to neutralize water-soluble acids present in the said oleo-resin exudates and a portion only of the resin acids in the said exudates, thus avoiding the conversion of the exudates into an oleo-resin aggregate that is appreciably soluble in water, and maintaining the said exudates in fluid, readily miscible form throughout this treatment, to produce thereby a non-corrosive, substantially water-insoluble oleo-resin exudate that is flowable under ordinary shipping conditions.

7. A process comprising treating undistilled pine oleo-resin exudates with an alkaline reagent containing an alkaline earth metal compound sufficient in amount to neutralize water-soluble acids present in the said oleo-resin exudates and a portion only of the resin acids in the said exudates, thus avoiding the conversion of the exudates into an oleo-resin aggregate that is appreciably soluble in water, and maintaining the said exudates in fluid, readily miscible form throughout the treatment, to produce thereby a non-corrosive, substantially water-insoluble exudate that is flowable under ordinary shipping conditions.

8. In a process of treating crude pine oleo-resin exudates, mixing an alkaline reagent with crude pine oleo-resin exudates while injecting steam into a mass of the said exudates and converting water-soluble acids and a portion only of the resin acids contained in the said crude oleo-resin exudates into salts of the said acids, the resulting mixture of resin acids and resinates being immiscible with water, and filtering the resulting mass.

9. A process comprising mixing brine and an alkaline reagent with pine oleo-resin exudates while in fluid, miscible condition and converting water-soluble acids and a portion only of the resin acids contained in the said exudates into salts of the said acids, thus avoiding the conversion of the said exudates into an oleo-resin aggregate that is appreciably soluble in water, and separating from the resulting mass an oleo-resin exudate containing uncombined resin acids, and resinates.

10. In a process of treating crude pine tree oleo-resins to provide a substantially non-corrosive oleo-resin product substantially immune to discoloration by contact with metal, the said crude oleo-resins containing the aggregate of pine tree exudates including resin acids and organic, ionizable, water-soluble acids, the procedure to be used prior to the treatment of such oleo-resins to obtain rosin and turpentine therefrom, comprising thoroughly mixing with the said aggregate containing the said resin acids and organic, ionizable, water-soluble acids an alkaline reagent to effect a reaction with substantially all of the said water-soluble acids, and with a portion only of the said resin acids in the aggregate, thereby providing an oleo-resin exudate containing uncombined resin acids and resin acids reacted with the said alkaline reagent, the resulting mixture being immiscible with water and flowable under ordinary conditions of shipping.

11. A pine oleo-resin product comprising pine oleo-resin exudate consisting of constituents of substantially all of the relatively water-insoluble portion of pine sap as obtained from living trees including resin acids, terpenes and other oleaginous constituents normally contained in such sap, the said resin acids being capable of crystallizing out under ordinary conditions of shipment and storage; and resinates of the said resin acids having combined with a resin acid radical a positive radical selected from a group consisting of $NH_4$, alkali metals and alkaline earth metals, the said resinates being sufficient in amount to prevent crystallization of the said resin acids but insufficient to render the exudate completely soluble in water, and the said product being substantially non-corrosive to metals in containers used for shipment and being flowable at ordinary shipping temperatures.

12. A pine oleo-resin product comprising pine oleo-resin exudate consisting of constituents of substantially all of the relatively water-insoluble portion of pine sap as obtained from living trees including resin acids, terpenes and other oleaginous constituents normally contained in such sap, the said resin acids being capable of crystallizing out under ordinary conditions of shipment and storage; and sodium resinate sufficient in amount to prevent crystallization of the said resin acids but insufficient to render the exudate completely soluble in water, the said product being substantially non-corrosive to metals in containers used for shipment and being flowable at ordinary shipping temperatures.

13. A pine oleo-resin product comprising pine oleo-resin exudate consisting of constituents of substantially all of the relatively water-insoluble portion of pine sap as obtained from living trees including resin acids, terpenes and other oleaginous constituents normally contained in such sap, the said resin acids being capable of crystallizing out under ordinary conditions of shipment and storage; and calcium resinate sufficient in amount to prevent crystallization of the said resin acids but insufficient to render the exudate completely soluble in water, the said product being substantially non-corrosive to metals in containers used for shipment and being flowable at ordinary shipping temperatures.

14. A pine oleo-resin product comprising pine oleo-resin exudate consisting of constituents of substantially all of the relatively water-insoluble portion of pine sap as obtained from living trees including resin acids, terpenes and other oleaginous constituents normally contained in such sap, the said resin acids being capable of crystallizing out under ordinary conditions of shipment and storage; and ammonium resinate sufficient in amount to prevent crystallization of the said resin acids but insufficient to render the exudate completely soluble in water, the said product being substantially non-corrosive to metals in containers used for shipment and being flowable at ordinary shipping temperatures.

McGARVEY CLINE.